United States Patent [19]

Gleason et al.

[11] Patent Number: 4,518,510
[45] Date of Patent: May 21, 1985

[54] DRILLING MUD DISPERSANTS

[75] Inventors: Patricia A. Gleason, Westfield; Ingrid E. Brase, Plainsboro, both of N.J.

[73] Assignee: National Starch and Chemical Corporation, Bridgewater, N.J.

[21] Appl. No.: 558,131

[22] Filed: Dec. 5, 1983

[51] Int. Cl.$^3$ .............................................. C09K 7/02
[52] U.S. Cl. ............................ 252/8.5 C; 252/8.5 A
[58] Field of Search ......................... 252/8.5 C, 8.5 A

[56] References Cited

U.S. PATENT DOCUMENTS

| | | | |
|---|---|---|---|
| 2,650,905 | 9/1953 | Fordyce et al. | 252/8.5 |
| 2,718,497 | 9/1955 | Oldham | 252/8.5 |
| 3,332,872 | 7/1967 | Oakes | 252/8.5 |
| 3,730,900 | 5/1973 | Perricone et al. | 252/8.5 |

Primary Examiner—Herbert B. Guynn
Attorney, Agent, or Firm—Edwin M. Szala; Lori D. Tolly

[57] ABSTRACT

Dispersants useful in aqueous drilling mud formulations employed in the drilling of subterranean wells where high temperature and high pressure environments are encountered are disclosed. The dispersants, when used in amounts of about 0.1 to 25 ppb provide muds containing colloidal material suspended in an aqueous medium with improved high temperature and high pressure stability. The dispersants are water soluble sulfonated vinyl toluene-maleic anhydride copolymers which have a molar ratio of vinyl toluene to maleic anhydride of about 1:1 to less than about 2:1, a molecular weight of 1,000 to 25,000 and at least about 0.7 sulfonic acid groups per vinyl toluene unit.

18 Claims, No Drawings

DRILLING MUD DISPERSANTS

BACKGROUND OF THE INVENTION

This invention relates to fluids or muds useful in the drilling of subterranean wells. More particularly, it relates to improved aqueous drilling mud additives comprising sulfonated low molecular weight copolymers of vinyl toluene and maleic anhydride which are useful as dispersants providing muds with improved colliodal stability under high temperature and/or high pressure conditions.

In drilling subterranean wells and especially when employing rotary methods, drilling muds or fluids perform a variety of functions which influence such factors as the drilling rate, cost, efficiency and safety of the operation. Drilling muds are circulated down through the drill shaft, out the bottom of the drill bit and up the annular space between the drill pipe and the formation wall to the surface where they may be mechanically or chemically treated and recirculated. The muds provide lubrication at the point where the drill bit cuts into a geologic formation as well as along the length of the rotary drill pipe. As it lubricates the system, the mud removes heat which is produced by the cutting action of the bit while additionally performing the important task of transporting cuttings produced by the system to the surface for removal. An acceptable mud must have body yet be free flowing with a measurable relatively low viscosity in order to be easily pumped. In addition, the mud must have an acceptable gel strength in order to suspend the solid material if circulation is interrupted and to prevent accumulation of solids at the bit thus preventing mechanical jamming. The muds must also provide sufficient equalizing pressure to contain any liquid or gaseous components encountered in the natural formations pierced by the drill. By using proper mud formulations, possible collapses or blowouts resulting from uncontrolled influxes of formation fluids may be prevented. Inorganic colloidal materials such as bentonitic clays are generally added to the mud formulation to impart a desired thixotropic or gel structure to the system.

In addition to preventing the flow of formation fluids into the hole, drilling muds should also minimize the flow of fluid out into the formation. Both functions are served by the ability of the mud to form a thin but substantially impervious filter cake against exposed permeable formations. Excessive loss of liquid to the formation results in increased mud viscosities which causes decreases in drilling times in addition to poorer cuttings removal and lubrication. In U.S. Pat. No. 2,650,905 (issued Sept. 1, 1953 to Fordyce et al), use of sulfonated polystyrene polymers employed as drilling mud additives was shown to aid in forming substantially impermeable films around the walls of the bore hole in order to decrease the loss of fluid from the mud to the surrounding earthen formation while at the same time not affecting the viscosity of the muds.

The efficiency of the drilling process is related to the velocity at which the mud travels up the annulus which in turn is related to its viscosity as well as flow and density properties. Drilling mud viscosity is known to depend on the quality, concentration and state of dispersion of the colloidal solids of the mud. As the drilling operation proceeds, the thixotropy of the mud may be deleteriously affected by such factors as the character of the drilled strata, the loss or gain of water to the mud, chemically active contaminants which may flocculate the mud, the pH of the mud, and especially the increasing temperatures and pressures encountered at deeper drilling depths. In order to maintain workable viscosities, the muds must be formulated to dynamically respond to varying circumstances and conditions encountered during use. Due to the fact that improvements in efficiency are realized as the viscosity and density of a mud are increased, it is desirable to optimize drilling mud formulations to possess the highest viscosity and density workably feasible for a given formation at a given depth. Oftentimes colloidal stabilizing materials are employed.

Various naturally occurring anionic polymers and their derivatives such as mined lignins, tannins, polyphosphates and lignosulfonates have been employed as thinners or dispersants in drilling operations to depths of up to about 12,000 feet. Unfortunately these materials are unstable under increased temperatures and pressures, sometimes exceeding 450° F. and 5000 psi, which are encountered upon deeper penetration of drilling operations. Upon exposure to such adverse conditions, flow resistance of the muds increases due to dispersant degradation resulting in excessive gel strengths and solidification. More energy and higher pressures are then required to pump the muds. Moreover, the instability of these additives usually requires their near to complete replacement during mud reconditioning before recirculation into the drill hole which results in increased drilling operation costs due to significant lost drill time. For these reasons more costly oil-based muds are sometimes chosen to be employed in the field due to their ability to withstand repeated exposures to high temperatures and pressures.

U.S. Pat. No. 3,730,900 (issued May 1, 1973 to Perricone et al) describes the use of low molecular weight styrene sulfonic acid-maleic anhydride copolymers as drilling mud additives useful as colloidal stabilizers. The copolymers are described as being particularly effective when drilling under high temperature and pressure environments.

The subterranean well drilling industry is still searching for means which provide improved aqueous drilling muds which are stable after prolonged as well as repeated exposure to high temperatures and pressures. For instance, the ability to extend the stability of a drilling mud subjected to a temperature of 500° F. by a period of as little as 0.5 to 0.1 hours would be recognized in the field as a significant improvement. In addition, there is also a need in the art for a drilling mud additive which has increased tolerance to salt and/or highly alkaline pH environments.

The present invention provides drilling mud additives with improved high temperature-high pressure stabilities over styrene-sulfonic acid maleic anhydride copolymer dispersants. By employing the additives described herein in drilling mud formulations, superior performance and efficiency in drilling operations may be realized due to fewer stuck pipes resulting in fewer shutdowns, less energy required to pump the mud, as well as the ability to more efficiently reuse the additives after repeated exposure to high temperature-high pressure conditions. The additives also possess improved salt and high alkaline pH tolerance.

SUMMARY OF THE INVENTION

The present invention provides drilling mud dispersants with improved high temperature—high pressure stability comprising sulfonated low molecular weight copolymers of vinyl toluene and maleic anhydride and water soluble salts thereof. By employing these copolymer dispersants in amounts of about 0.1 to 25 ppb, drilling mud formulations are provided which possess improved colloidal stability under high temperatures and/or high pressure conditions. The copolymers contemplated herein ordinarily have a vinyl toluene to maleic anhydride molar ratio ranging from about 1:1 to less than 2:1 with the preferred ratio being from 1:1 to 1.5:1 and most preferably 1:1. The copolymers useful herein must be sulfonated to an extent necessary to render the copolymer water soluble. Normally a copolymer containing upwards of about 0.7 sulfonic acid group per vinyl toluene unit is required. Copolymers containing about stoichiometric amounts of sulfonic acid to vinyl toluene unit are preferred. The molecular weight of the useful sulfonated copolymer ranges from about 1,000 to 25,000, preferably from about 4,000 to 17,000. A process for drilling a subterranean well with a fluid containing said copolymer is also taught.

DESCRIPTION OF THE PREFERRED EMBODIMENTS

The low molecular weight drilling fluid additives of the present invention may be prepared according to any number of conventional methods. For instance, the vinyl toluene-maleic anhydride copolymer may be prepared by free radical polymerization employing such techniques as bulk, emulsion, suspension, precipitation, or solution polymerization. Suitable processes include those taught in U.S. Pat. Nos. ,2,606,891 (issued Aug. 12, 1952 to Rowland et al), 2,650,819 (issued June 2, 1953 to Barrett), 3,085,994 (issued Apr. 16, 1983 to Muskat), and 3,960,824 (issued June 1, 1976 to Hicks). The copolymer is thereafter sulfonated by known methods with sulfur trioxide or other sulfur-containing reagent to an extent sufficient to render the copolymer water soluble. The copolymer should contain at least about 0.7 sulfonic acid groups per vinyl toluene unit with a stoichiometric amount being preferred. See, for example, the teachings of U.S. Pat. Nos. 3,072,618 and 3,072,619 (both issued Jan. 8, 1963 to Turbak). It should be understood that any method providing sulfonated copolymers within the 1,000-25,000 molecular weight range with a vinyl toluene to maleic anhydride molar ratio of about 1:1 to less than 2:1 in satisfactory yields of acceptably pure product will prove satisfactory.

Any vinyl toluene monomer may be copolymerized with maleic anhydride to produce a copolymer useful herein. The use of para-vinyl toluene or a mixture of para and meta isomers is preferred. Of course minor amounts of other polymerizable monomers may be employed; however, no improvement over a copolymer prepared from only vinyl toluene and maleic anhydride is expected. Typical monomers for use in small amounts would include styrene, alpha-alkyl styrenes, dienes, and alpha-beta ethylenically unsaturated dicarboxylic acids or esters thereof.

The quantities of the sulfonated vinyl toluene-maleic anhydride copolymer utilized will vary with circumstances depending on such factors as the weight and character of the drilling fluid treated, the formation strata type encountered, drilling depths, contaminants, and temperatures and pressures encountered. Ordinarily improved viscosity control will be realized when the copolymer is used in amounts of about 0.1 to 25 pounds per 42-gallon barrel (ppb) of drilling mud. Preferably the copolymer is added at the 1 to 3 ppb treatment level. The exact amount to be added can be determined by simple routine tests known by those skilled in the art at the time the addition is made.

It is contemplated that in addition to various clays and weighting materials, other additives besides the copolymers of the invention may be incorporated into the muds. For example, caustic, lime, starch, carboxymethylcellulose, quebracho, lignite, lignosulfonate and other commonly utilized additives and fluid loss agents may be added to the drilling composition.

The following examples are presented to particularly illustrate the invention but they are not intended to limit it in any manner except as it is limited in the appended claims.

EXAMPLE 1

This example illustrates the ability of sulfonated vinyl toluene-maleic anhydride (VT-MA) copolymers to effectively stabilize a dense mud formulation under high temperatures and high pressure. The apparatus utilized to evaluate the muds was a Fann Model 5S-TDL Consistometer which is described in U.S. Pat. No. 3,073,150 issued on Jan. 15, 1963 to Fann. By using the consistometer, the rheology of the mud may be measured in relative consistency units. A consistency unit value approaching or equal to one represents a highly viscous, undesirable mud state caused by thermal instability.

A synthetic drilling mud having a relative density of 16 lbs/gal, considered to be a standard in high temperature-high pressure testing, was prepared. The base mud formulation consisted of: 475 g barite, 20 g kaolinite clay, 20 g bentonite clay, 0.75 g carboxymethylcellulose, and 350 g well water (220 ppm hardness). Three grams of various polymers (all sodium salts) were added to this base mud formulation correponding to a 3 ppb treatment level. Initial viscosities of the muds were measured. See Table I for data.

TABLE I

| Sample | Polymer (1) | Molecular Weight of Polymer | Mud Initial Viscosity (cps) (5) |
| --- | --- | --- | --- |
| Base Mud | None | — | 122 |
| A | Sulfonated 1:1 VT-MA (2) | 4,030 | 55 |
| B | Sulfonated 1:1 VT-MA (2) | 7,250 | 62 |
| C | Sulfonated 1:1 VT-MA (3) | 6,290 | 65 |
| D | Sulfonated 1:1 VT-MA (2) | 16,200 | 67 |
| E | Sulfonated 1:1 VT-MA (3) | 13,900 | 77 |
| F | Sulfonated 1:1 Styrene-MA (4) | 3,410 | 65 |
| G | Polysodium Maleate | — | 82 |
| H | Sulfonated 1:1 α-Methyl-styrene-MA | 14,000 | 83 |

(1) All sulfonated copolymers were sulfonated with stoichiometric amounts of $SO_3$ based on aromatic constitution.
(2) Vinyl toluene used was a mixture of 60:40 para-meta vinyl toluene.
(3) Vinyl toluene used was a 97% pure para-vinyl toluene.
(4) Sulfonated copolymer similar to a product in U.S. Pat. No. 3,730,900.
(5) Viscosity measured at 75° F. at atmospheric pressure.

The mud samples were then heated to 500° F. at a pressure of 8,000 psi over a period of 1.25 hours. The relative consistencies of the muds were recorded every 15 minutes. While under constant high temperature and pressure the relative consistencies were thereafter recorded every 10 minutes. As can be seen from the data found in Table II, the muds containing the sulfonated VT-MA copolymers were stabilized for significantly longer periods of time than the mud which contained the sulfonated styrene-maleic anhydride copolymer. Polysodium maleate and sulfonated α-methylstyrene-maleic anhydride demonstrated little or no stabilization to the base mud at high temperatures and pressure.

2:1 and higher ratio VT-MA copolymers when subjected to similar high temperature-high pressure conditions. It is noted that both muds containing 1:1 VT-MA and 1:1 styrene-MA copolymers began to gel at similar times and temperatures. The mud with the styrene-MA copolymer however formed a complete gel 95 minutes before the mud containing the VT-MA dispersant.

TABLE II

| SAMPLE | | CONSISTENCY UNITS (1) | | | | | | | |
|---|---|---|---|---|---|---|---|---|---|
| Time (min.) | Temp. (°F.) | Blank | A | B | C | D | E | F | G | H |
| 0 | 75 | 0.80 | 0.36 | 0.60 | 0.37 | 0.31 | 0.63 | 0.40 | 0.55 | 0.48 |
| 15 | 100 | 0.62 | 0.20 | 0.34 | 0.18 | 0.22 | 0.30 | 0.30 | 0.42 | 0.43 |
| 30 | 200 | 0.17 | 0.11 | 0.17 | 0.11 | 0.13 | 0.15 | 0.14 | 0.12 | 0.36 |
| 45 | 350 | 0.00 | 0.09 | 0.07 | 0.10 | 0.08 | 0.05 | 0.04 | 0.10 | 0.27 |
| 60 | 475 | 1.00 | 0.10 | 0.01 | 0.11 | 0.08 | 0.04 | 0.01 | 1.00 | 0.25 |
| 75 | 500 | | 0.12 | 0.07 | 0.12 | 0.10 | 0.06 | 0.01 | | 0.22 |
| Time After 500° F. | | | | | | | | | | |
| 10 | | | 0.13 | 0.08 | 0.12 | 0.10 | 0.06 | 0.02 | | 1.00 |
| 20 | | | 0.14 | 0.10 | 0.13 | 0.10 | 0.07 | 0.04 | | |
| 30 | | | 0.15 | 0.09 | 0.13 | 0.11 | 0.09 | 0.07 | | |
| 40 | | | 0.17 | 0.09 | 0.15 | 0.12 | 0.10 | 0.17 | | |
| 50 | | | 0.19 | 0.10 | 0.15 | 0.14 | 0.11 | 0.47 | | |
| 60 | | | 0.21 | 0.12 | 0.16 | 0.16 | 0.13 | 1.00 | | |
| 70 | | | 0.30 | 0.18 | 0.16 | 0.21 | 0.13 | | | |
| 80 | | | 0.46 | 0.25 | 0.16 | 0.28 | 0.13 | | | |
| 90 | | | 0.62 | 1.00 | 0.23 | 0.41 | 0.18 | | | |
| 100 | | | 0.62 | | 0.32 | 1.00 | 0.18 | | | |
| 110 | | | 1.00 | | 0.62 | | 0.18 | | | |
| 120 | | | | | 1.00 | | 0.27 | | | |
| 145 | | | | | | | 1.00 | | | |

(1) Measured at 8,000 psi.

TABLE III

| Copolymer Dispersant | Molecular Weight of Copolymer | Time to Initiate Gel (min.) | Temp. at Gel Initiation (°F.) | Time to Complete Gel (min.) |
|---|---|---|---|---|
| Sulfonated 1:1 VT-MA | 4,030 | 80 | 500 | 140 |
| Sulfonated 2:1 VT-MA | 6,610 | 45 | 375 | 45 |
| Sulfonated 4:1 VT-MA | 5,210 | 50 | 350 | 15 |
| Sulfonated 6:1 VT-MA | 4,060 | 45 | 350 | 10 |
| Sulfonated 1:1 Styrene-MA | 3,410 | 80 | 500 | 45 |
| Sulfonated 1:1 α-Methyl-styrene-MA | 14,000 | 40 | 350 | 35 |

EXAMPLE 2

This example demonstrates the criticality of the molar ratio of the vinyl toluene and maleic anhydride monomers of the sulfonated copolymer when tested in a dense mud formulation under high temperature-high pressure conditions.

VT-MA copolymers were prepared with 1:1 to 6:1 molar ratios of vinyl toluene to maleic anhydride. A 60:40 para-meta isomeric mixture of vinyl toluene was employed. The copolymers were then sulfonated with stoichiometric amounts of sulfur trioxide in relationship to the aromatic constitution of each copolymer.

Dense mud formulations (13 lb/gal density) were prepared with 350 g barite, 20 g kaolinite clay, 20 g bentonite clay, 0.75 g carboxymethylcellulose and 350 ml well water. Samples of the sodium salts of the sulfonated VT-MA copolymers were added at a 3 ppb addition level to the muds then tested following the procedure of Example 1. The sodium salts of sulfonated 1:1 styrene-maleic anhydride copolymer and sulfonated 1:1 α-methylstyrene-maleic anhydride copolymer (Copolymers F and H respectfully of Table I) were tested for comparison.

The results found in Table III indicate that there is a significant difference in stability between the 1:1 and the

EXAMPLE 3

A drilling mud is in motion while it is being used, therefore the parameters describing its flow behavior and its resistance to movement are of great importance. This example demonstrates the ability of the copolymer of the present invention to stabilize the dense mud formulation of Example 1 after repeated high temperature aging cycles.

Copolymers A and F (described in Table I) were added at 1 ppb addition levels to the base mud. The muds were conditioned by stirring for 20 minutes then statically aged for 16 hours in pressurized steel cells at 450° F. The samples were cooled to room temperature and mixed for 5 minutes with a Hamilton Beach Multimixer before the flow properties were determined using a Fann Model 35A viscometer. High temperature aging was repeated for a total of 3 cycles. Upon initial observation both muds containing copolymers A and F were smooth unpourable pastes after each aging but were pourable after remixing. The base mud without dispersant remained an unpourable paste even upon remixing after the first two cycles. Only after the third aging and remixing was the base mud smooth and pourable, indicating that high temperatures may have an effect on the clay structure of the mud as well.

The results found in Table IV show that sulfonated VT-MA copolymer is an effective dispersant stabilizer upon repeat aging. The mud with sulfonated VT-MA (A) had an apparant viscosity which only increased slightly after 3 agings. After a third aging the apparent viscosity of the mud with sulfonated styrene-MA copolymer, (F) however, had increased dramatically in comparison to its viscosity after the first again indicating instability of the additive.

The yield point of the mud, also a critical measurement for determining dispersant stability, is a quantitative measure of the attractive forces of the solids particles of a mud under low shear. This attraction is a function of their intrinsic electrical charges as well as their concentration and the character of the liquid phase in which the particles are suspended. It is desirable to have a stabilized mud system with a low yield point which is less resistant to flow. It is seen that the mud with copolymer A had a lower yield point than the mud employing copolymer F.

The gel strength of a mud measures the thixotropic character of the mud. It is a measure of the ease or difficulty with which a column of mud at rest can be pumped. Table IV shows that in addition to having a low apparent viscosity and yield point, the mud which contained sulfonated VT-MA (A) had an acceptably low gel strength.

EXAMPLE 4

This example demonstrates the heat stability of muds employing sulfonated VT-MA copolymers of the present invention in an aqueous mixed system of hydratable and semi-hydratable clays.

Mud formulations were prepared wherein each sample contained 25 g hydratable sodium montmorillonite (bentonite), 55 g semi-hydratable calcium montmorillonite, and 350 ml water (220 ppm hardness).

TABLE IV

| SAMPLE | DEGREE FANN 600 rpm | DEGREE FANN 300 rpm | VISCOSITY APPARENT[2] (cps) | VISCOSITY PLASTIC[3] (cps) | YIELD POINT[4] (lbs/100 ft$^2$) | GEL STRENGTH 10 sec. (lb/100 ft.$^2$) |
|---|---|---|---|---|---|---|
| BASE MUD: | | | | | | |
| Aging 1 | 300+ | 300+ | — | — | — | — |
| Aging 2 | 280 | 225 | 140 | 55 | 170 | 105 |
| Aging 3 | 135 | 98 | 68 | 37 | 61 | 9 |
| MUD + A:[1] | | | | | | |
| Aging 1 | 55 | 29 | 28 | 26 | 3 | 1 |
| Aging 2 | 57 | 31 | 29 | 26 | 5 | 1 |
| Aging 3 | 66 | 38 | 33 | 28 | 10 | 2 |
| MUD + F:[1] | | | | | | |
| Aging 1 | 65 | 35 | 33 | 30 | 5 | 2 |
| Aging 2 | 77 | 43 | 39 | 34 | 9 | 2 |
| Aging 3 | 99 | 57 | 50 | 42 | 15 | 2 |

[1]Copolymers added at 1 ppb addition level.
[2]Degrees Fann at 600 rpm divided by 2.
[3]Degrees Fann at 600 rpm less reading at 300 rpm.
[4]Degrees Fann at 300 rpm less plastic viscosity.

The base muds were mixed 20 minutes and aged 16 hours at room temperature. Copolymers A, D, E, and F were added at a treatment level corresponding to 1 ppb. Each sample was mixed for 5 minutes and initial flow properties were measured. The samples were placed on a tumbler for 16 hours at 150° F., cooled to room temperature, and mixed for 5 minutes before flow properties and A.P.I. filtration were measured. The samples were then sealed in aging cells and aged statically at 450° F. for 16 hours. After cooling and remixing, the samples were reevaluated. The filtration test employed the standard procedure described in API Recommended Practice, 13B, May, 1982. See Table V for data.

The results show that the muds treated with the copolymers of the present invention showed little change in properties such as gel strength and yield point after the 150° F. tumble or the 450° F. static aging. On the other hand, the 450° F. static aging had a significant adverse effect on the mud which contained copolymer F.

TABLE V

| SAMPLE | VISCOSITY APPARENT (cps) | VISCOSITY PLASTIC (cps) | YIELD POINT (lbs/100 ft$^2$) | GEL STRENGTH 10 sec. (lb/100 ft$^2$) | A.P.I. FILTRATION cc. at 30 min. |
|---|---|---|---|---|---|
| BASE MUD | | | | | |
| Initial | 47 | 28 | 37 | 28 | — |
| 150° F. Tumble | 47 | 31 | 31 | 17 | 6 |
| 450° F. Static | 68 | 33 | 69 | 45 | 13 |
| MUD + A | | | | | |
| Initial | 31.5 | 22 | 19 | 3 | — |
| 150° F. Tumble | 38 | 30 | 16 | 3 | 7 |
| 450° F. Static | 82.5 | 48 | 69 | 8 | 10 |
| MUD + D | | | | | |
| Initial | 36 | 24 | 24 | 5 | — |
| 150° F. Tumble | 50.5 | 38 | 25 | 4 | 6 |
| 450° F. Static | 62 | 45 | 34 | 4 | 9.5 |
| MUD + E | | | | | |
| Initial | 54 | 40 | 28 | 4 | — |

TABLE V-continued

| SAMPLE | VISCOSITY APPARENT (cps) | VISCOSITY PLASTIC (cps) | YIELD POINT (lbs/100 ft²) | GEL STRENGTH 10 sec. (lb/100 ft²) | A.P.I. FILTRATION cc. at 30 min. |
|---|---|---|---|---|---|
| 150° F. Tumble | 50 | 30 | 40 | 4 | 6 |
| 450° F. Static | 62 | 47 | 30 | 4 | 9.5 |
| MUD + F | | | | | |
| Initial | 41 | 33 | 16 | 4 | — |
| 150° F. Tumble | 38.5 | 28 | 21 | 3 | 7 |
| 450° F. Static | 113.5 | 52 | 123 | 26 | 10.5 |

EXAMPLE 5

This example illustrates the ability of sulfonated VT-MA copolymers of the present invention to effectively stabilize a bentonite suspension contaminated with sodium chloride and gypsum.

Muds were prepared wherein each sample contained 45 g bentonite, 7.5 g NaCl, 5 g gypsum and 350 ml distilled water. The base muds were mixed 20 minutes then aged 16 hours at room temperature. One gram of copolymers A and F were added to the muds which corresponds to a 1 ppb treatment level. The muds were evaluated by the same procedure found in Example 3. See Table VI for data.

TABLE VI

| SAMPLE | VISCOSITY APPARENT (cps) | VISCOSITY PLASTIC (cps) | YIELD POINT (lbs/100 ft²) | GEL STRENGTH 10 sec. (lb/100 ft²) | A.P.I. FILTRATION 30 min. |
|---|---|---|---|---|---|
| MUD + A | | | | | |
| Initial | 111 | 19 | 184 | 88 | — |
| 150° F. Tumble | 42.5 | 8 | 69 | 39 | 16 |
| 450° F. Static | 106 | 13 | 186 | 81 | 33 |
| MUD + F | | | | | |
| Initial | 126.5 | 25 | 203 | 91 | — |
| 150° F. Tumble | 93 | 29 | 128 | 62 | 17.5 |
| 450° F. Static | 122 | 12 | 220 | 114 | 29 |

EXAMPLE 6

This example illustrates the dispersant stability and pH tolerance of the sulfonated VT-MA copolymer in a highly alkaline mud formulation.

A 17.5 ppg South Louisiana field mud having a high pH and being heavily treated with lignite and lignosulfonate was employed which had the following initial properties:

| | |
|---|---|
| pH | 11.94 |
| Apparent Viscosity (cps) | 27 |
| Plastic Viscosity (cps) | 26 |
| Yield Point (lb./100 ft.²) | 2 |
| 10 sec. gel (lb./100 ft.²) | 3 |
| 10 min. gel (lb./100 ft.²) | 7 |
| Calcium Conc. (mg/l) | 240 |
| Chloride Conc. (mg/l) | 6100 |

The viscosity measurements were recorded at 120° F.

A sample of sulfonated VT-MA copolymer (E) of Example 1 was added at a 2 ppb additional level to the mud. The sulfonated styrene-MA copolymer (F) of Example 1 was tested at the same addition level for comparison. The muds were slowly heated to a temperature of 500° F. over a period of about one hour. At the same time the pressure was increased from 1,000 psi. to 12,000 psi. See Table VII for the mud stability data.

TABLE VII

| Sample | Temp. at Gel Initiation (°F.) | Temp. for Complete Gel (°F.) |
|---|---|---|
| Base Mud | 260 | 350 |
| Mud + E | 460 | 500 |
| Mud + F | 410 | 470 |

The results show that the sulfonated VT-MA copolymer had what would be a recognizable improvement in the field in stability under high pH as well as high temperature and high pressure conditions.

Summarizing, drilling mud additives with improved high temperature-high pressure stability are provided. Drilling mud formulations with improved stability are obtained when sulfonated low molecular weight vinyl toluene-maleic anhydride copolymers are employed as colloidal dispersants.

The preferred embodiments of the present invention having been described above, various modifications and improvements thereof will now become readily apparent to those skilled in the art. Accordingly, the spirit and scope of the present invention is defined not by the foregoing disclosure, but only by the appended claims.

We claim:

1. An improved aqueous subterranean drilling mud composition comprising a colloidal material suspended in an aqueous medium and a dispersant therefor, wherein the improvement comprises as the dispersant, the presence of 0.1 to 25 ppb. of a water soluble sulfonated vinyl toluene-maleic anhydride copolymer or salt thereof, the copolymer having a molar ratio of vinyl toluene to maleic anhydride of about 1:1 to less than about 2:1, a molecular weight of about 1,000 to 25,000 and at least about 0.7 sulfonic acid groups per vinyl toluene unit, the mud being characterized by improved high temperature and high pressure stability.

2. The drilling mud of claim 1, wherein the copolymer is in salt form and the molar ratio of vinyl toluene to maleic anhydride is about 1:1 to 1.5:1.

3. The drilling mud of claim 2, wherein the molar ratio of vinyl toluene to maleic anhydride is about 1:1, the molecular weight is between 4,000 and 17,000, and the drilling mud has a density of about 13 to 16 lb./gal.

4. The drilling mud of claim 1, wherein the vinyl toluene is primarily para-vinyl toluene.

5. The drilling mud of claim 1, wherein the vinyl toluene is a mixture of about 50 to 60 parts para-vinyl toluene and about 40 to 50 parts meta-vinyl toluene.

6. The drilling mud of claim 1, wherein 1 to 3 ppb. of said copolymer is present.

7. The drilling mud of claim 1, wherein the copolymer is in water soluble salt form.

8. The drilling mud of claim 1, further characterized by having high alkaline pH tolerance.

9. The drilling mud of claim 1, further characterized by having salt tolerance.

10. In an improved process for drilling a subterranean formation well comprising circulating an aqueous drilling mud composition down a drill shaft, through a drill bit and up between the shaft and formation, the mud composition comprising a colloidal material suspended in an aqueous medium and a dispersant therefor, wherein the improvement comprises adding as the dispersant from about 0.1 to 25 ppb, of a water soluble sulfonated vinyl toluene-maleic anhydride copolymer or salt thereof, the copolymer having a molar ratio of vinyl toluene to maleic anhydride of about 1:1 to less than about 2:1, a molecular weight of about 1,000 to 25,000 and at least about 0.7 sulfonic acid groups per vinyl toluene unit whereby the drilling mud composition is characterized by improved high temperature and high pressure stability.

11. The process of claim 10, wherein the copolymer is in salt form and the molar ratio of vinyl toluene to maleic anhydride is about 1:1 to 1.5:1.

12. The process of claim 11, wherein the molar ratio of vinyl toluene to maleic anhydride is about 1:1, the molecular weight is between 4,000 and 17,000, and the drilling mud has a density of about 13 to 16 lb./gal.

13. The process of claim 10, wherein the vinyl toluene is primarily para-vinyl toluene.

14. The process of claim 10, wherein the vinyl toluene is a mixture of about 50 to 60 parts para-vinyl toluene and about 40 to 50 parts meta-vinyl toluene.

15. The process of claim 10, wherein 1 to 3 ppb. of said copolymer is present.

16. The process of claim 10, wherein the copolymer is in water soluble salt form.

17. The process of claim 10, further characterized by having high alkaline pH tolerance.

18. The process of claim 10, further characterized by having salt tolerance.

* * * * *